US009438050B2

(12) United States Patent
Takeda et al.

(10) Patent No.: US 9,438,050 B2
(45) Date of Patent: *Sep. 6, 2016

(54) OVERCHARGE DETECTING CIRCUIT AND INTEGRATED CIRCUIT

(71) Applicant: MITSUMI ELECTRIC CO., LTD., Tokyo (JP)

(72) Inventors: Takashi Takeda, Kanagawa (JP); Junji Takeshita, Kanagawa (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 1007 days.

This patent is subject to a terminal disclaimer.

(21) Appl. No.: 13/644,643

(22) Filed: Oct. 4, 2012

(65) Prior Publication Data

US 2013/0026997 A1     Jan. 31, 2013

Related U.S. Application Data

(63) Continuation of application No. 12/334,674, filed on Dec. 15, 2008, now Pat. No. 8,305,041.

(30) Foreign Application Priority Data

Dec. 21, 2007   (JP) ................................. 2007-330580

(51) Int. Cl.
*H02J 7/00* (2006.01)
*H01M 10/0525* (2010.01)
(Continued)

(52) U.S. Cl.
CPC ........ *H02J 7/0031* (2013.01); *H01M 10/0525* (2013.01); *H01M 10/425* (2013.01);
(Continued)

(58) Field of Classification Search
CPC ........... H02J 7/0031; H01M 10/0525; H01M 10/425; H01M 10/443; H01M 10/46; H01M 10/486
See application file for complete search history.

(56) References Cited

U.S. PATENT DOCUMENTS 4,616,216 A * 10/1986 Meirow ................. H01H 9/167
                                                         340/500
4,618,857 A * 10/1986 Dubois ................ G08B 29/181
                                                          307/66

(Continued)

FOREIGN PATENT DOCUMENTS

JP      2001-061232      3/2001
JP      2001-197676      7/2001

(Continued)

OTHER PUBLICATIONS

Integrated Circuit, available at https://web.archive.org/web/20050212101342/http://en.wikipedia.org/wiki/Integrated_circuit on Feb. 12, 2005.*

(Continued)

*Primary Examiner* — Daniel Miller
(74) *Attorney, Agent, or Firm* — IPUSA, PLLC (57) ABSTRACT

In a battery pack, an overcharge detecting circuit compares a voltage between a positive electrode and a negative electrode of a secondary battery with a threshold voltage to detect an overcharge of the secondary battery, and turns off a switching element. A series circuit including a thermistor and a resistor is arranged near the secondary battery and connected in parallel to the secondary battery. A comparator compares a voltage at a junction point of the thermistor and the resistor with a reference voltage corresponding to a predetermined temperature. In response to an output signal of the comparator, a changing unit changes the threshold voltage to a first value when a temperature of the secondary battery is below the predetermined temperature, and changes the threshold voltage to a second smaller value when the temperature of the secondary battery is above the predetermined temperature.

6 Claims, 11 Drawing Sheets

(51) Int. Cl.
*H01M 10/42* (2006.01)
*H01M 10/44* (2006.01)
*H01M 10/46* (2006.01)
*H01M 10/48* (2006.01)

(52) U.S. Cl.
CPC ........... *H01M10/443* (2013.01); *H01M 10/46* (2013.01); *H01M 10/486* (2013.01); *H02J 2007/004* (2013.01); *H02J 2007/0037* (2013.01); *H02J 2007/0039* (2013.01); *Y02E 60/122* (2013.01)

(56) References Cited

U.S. PATENT DOCUMENTS

| | | |
|---|---|---|
| 5,136,231 A | 8/1992 | Faulk |
| 5,703,468 A * | 12/1997 | Petrillo ............... H01M 10/44 320/101 |
| 6,118,253 A | 9/2000 | Mukainakano et al. |
| 6,819,083 B1 | 11/2004 | Patino et al. |
| 7,372,683 B2 | 5/2008 | Yamamura et al. |
| 7,375,498 B2 | 5/2008 | Yamamoto |
| 2005/0237029 A1 | 10/2005 | Takezawa et al. |
| 2007/0216349 A1 | 9/2007 | Sakaue et al. |

FOREIGN PATENT DOCUMENTS

| | | |
|---|---|---|
| JP | 2002-315177 | 10/2002 |
| JP | 2003-052120 | 2/2003 |
| JP | 2003-173825 | 6/2003 |
| JP | 2004-152580 | 5/2004 |
| JP | 2005-183098 | 7/2005 |

OTHER PUBLICATIONS

Japanese Office Action dated Nov. 13, 2012.

* cited by examiner

FIG.11 RELATED ART

OVERCHARGE DETECTING CIRCUIT AND INTEGRATED CIRCUIT

CROSS-REFERENCE TO RELATED APPLICATIONS

This application is a continuation patent application of, and claims the benefit of and priority to U.S. patent application Ser. No. 12/334,674 filed on Dec. 15, 2008, which is based on and claims the benefit of priority of Japanese Patent Application No. 2007-330580 filed on Dec. 21, 2007 with the Japanese Patent Office. The entire contents of U.S. patent application Ser. No. 12/334,674 and Japanese Patent Application No. 2007-330580 are hereby incorporated by reference.

BACKGROUND OF THE INVENTION

1. Field of the Invention

This invention relates to a battery pack including a protection circuit which detects an overcharge, an overdischarge or an overcurrent of a secondary battery and turns off a switching element arranged in wiring between a load and the secondary battery or between a charging device and the secondary battery.

2. Description of the Related Art

In recent years, a portable device, such as a digital camera, carries lithium ion batteries as secondary batteries. Because lithium ion batteries are prone to overcharging or overdischarging, the lithium ion batteries are arranged with a battery pack containing a protection circuit for protecting the batteries from overcharging or overdischarging.

Figure 10:
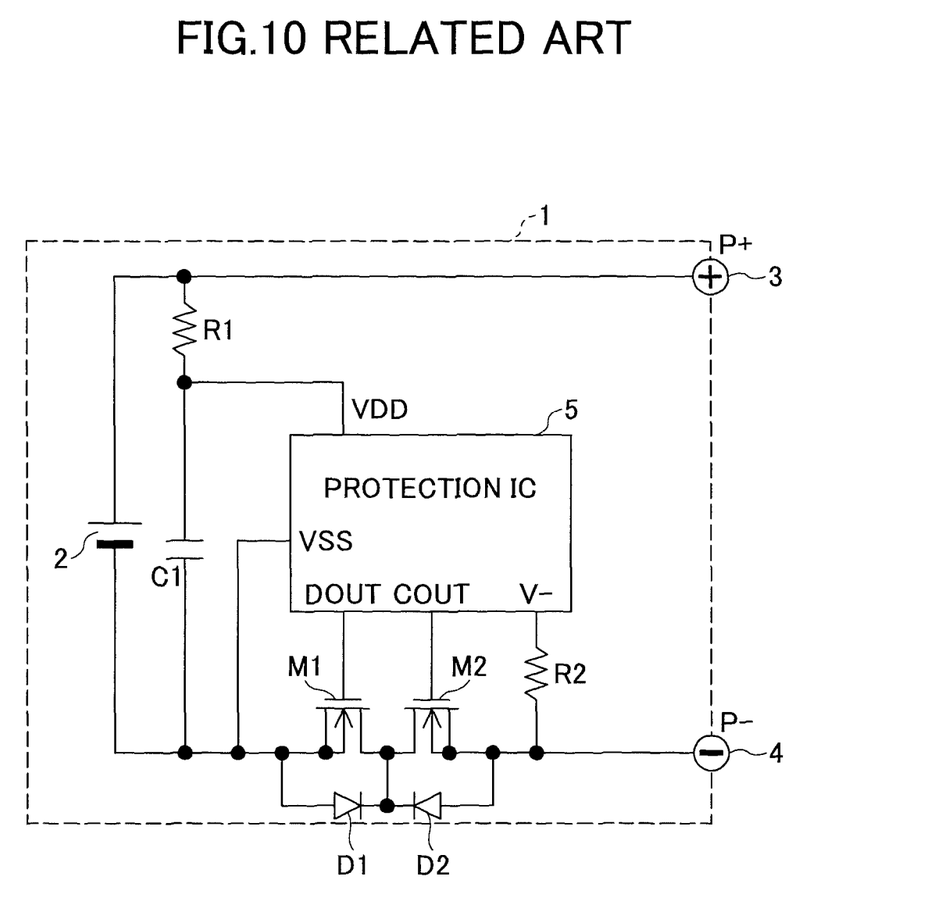
FIG. 10 is a block diagram showing the composition of a battery pack according to the related art.

FIG. 10 shows the composition of a battery pack 1 according to the related art. In the battery pack 1 of FIG. 10, a lithium ion battery 2 is connected in parallel to a series circuit in which a capacitor C1 and a resistor R1 are connected in series. A positive electrode of the lithium ion battery 2 is connected to an external terminal 3 of the battery pack 1, and a negative electrode of the lithium ion battery 2 is connected to an external terminal 4 of the battery pack 1 via a pair of n channel MOS (metal oxide semiconductor) transistors M1 and M2 for current interception.

The drains of the MOS transistors M1 and M2 are connected to each other, the source of the MOS transistor M1 is connected to the negative electrode of the lithium ion battery 2, and the source of the MOS transistor M2 is connected to the external terminal 4. Body diodes D1 and D2 are connected between the drain and the source of each of the MOS transistors M1 and M2 in an equivalent manner.

A protection IC (integrated circuit) 5 is arranged in the battery pack 1 so that the protection IC 5 includes an overcharge detecting circuit, an overdischarge detecting circuit, and an overcurrent detecting circuit. A power-source voltage Vdd is supplied to the protection IC 5 through the resistor R1 from the positive electrode of the lithium ion battery 2, and a power-source voltage Vss is supplied to the protection IC 5 from the negative electrode of the lithium ion battery 2, so that the protection IC 5 operates.

When an overdischarge or overcurrent is detected by the overdischarge detecting circuit or the overcurrent detecting circuit, the protection IC 5 sets the output signal DOUT to a low level to turn the MOS transistor M1 to an OFF state. When an overcharge is detected by the overcharge detecting circuit, the protection IC 5 sets the output signal COUT to the low level to turn the MOS transistor M2 to the OFF state.

Figure 11:
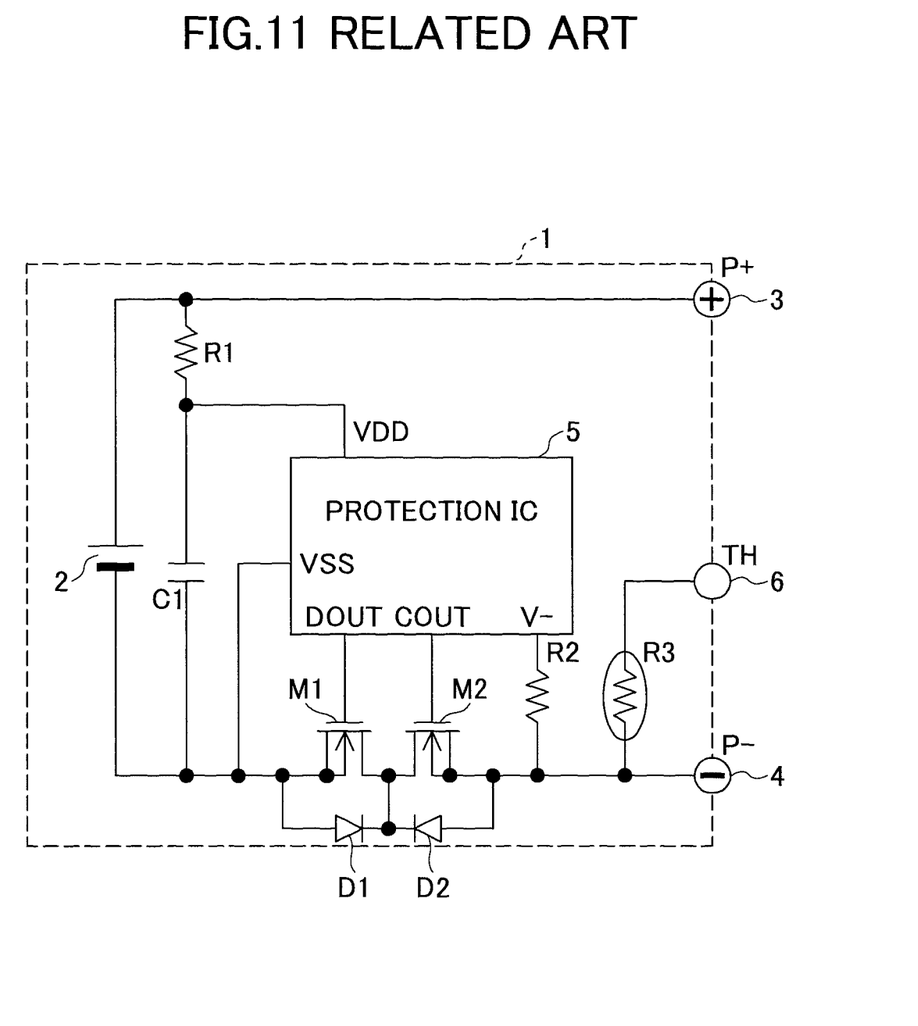
FIG. 11 is a block diagram showing the composition of a battery pack according to the related art.

FIG. 11 shows the composition of a battery pack 1 according to the related art. In the battery pack 1 of FIG. 11, a thermistor R3 is further arranged in the battery pack 1 in addition to the elements shown in FIG. 10. One end of the thermistor R3 is connected to a terminal 6 of the battery pack 1 and the other end of the thermistor R3 is connected to the external terminal 4.

A predetermined voltage from a charging device is applied to the terminal 6 of the battery pack 1 through a voltage divider resistor in order to charge the battery pack 1. The resistance of the thermistor R3 changes in accordance with a temperature of the battery pack 1, and the voltage of the terminal 6 changes accordingly. The voltage of the terminal 6 is detected and if a temperature of the battery pack 1 derived from the detected voltage exceeds a predetermined value, the charging device is controlled to stop the charging of the battery pack 1.

Japanese Laid-Open Patent Application No. 2004-152580 discloses a battery pack in which a first diode arranged in a first direction (charging direction) and connected in series to a temperature protection element (PTC element) and a second diode arranged in a second direction (discharging direction) opposite to the first direction and connected in parallel with the first diode and the temperature protection element (PTC element) are connected to a secondary battery. This battery pack is arranged so that, when normal discharging of the secondary battery is performed, a current flows only through a channel including the second diode in the second direction and does not flow through a channel including the first diode in the first direction. Thus, even when a temperature of the battery pack becomes high at the time of normal discharging, no current flows through the channel including the first diode and it is possible to inhibit operation of the temperature protection element (PTC element).

The battery pack according to the related art, shown in FIG. 10, does not have a temperature protection function to protect the battery pack from high temperature. The battery pack according to the related art, shown in FIG. 11, has a temperature protection function to protect the battery pack from high temperature. However, in this battery pack, the predetermined voltage from the charging device is supplied through the voltage divider resistor. In a case where the predetermined voltage of the charging device changes remarkably, or in a case where the resistance of the voltage divider resistor has a significant error, it is difficult to detect a temperature of the battery pack accurately, which hinders the battery pack from performing appropriate charging control.

SUMMARY OF THE INVENTION

In one aspect of the invention, the present disclosure provides an improved battery pack in which the above-described problems are eliminated.

In one aspect of the invention, the present disclosure provides a battery pack which has a temperature protection function for a secondary battery with good accuracy and is able to perform appropriate charging control.

In an embodiment of the invention which solves or reduces one or more of the above-mentioned problems, the present disclosure provides an overcharge detecting circuit configured to compare a voltage between a positive electrode and a negative electrode of a secondary battery with a threshold voltage to detect an overcharge of the secondary battery, and to turn off a switching element in a wiring between a load and the secondary battery or between a charging device and the secondary battery, the overcharge detecting circuit comprising: a series circuit including a thermistor and a resistor connected in series, the series circuit being arranged in a vicinity of the secondary battery, thermally coupled with the secondary battery, and connected in parallel to the secondary battery; a first comparator arranged to compare a voltage at a junction point of the thermistor and the resistor in the series circuit with a first reference voltage corresponding to a first predetermined temperature; and a changing unit arranged to change the threshold voltage to a first value when a detected temperature of the secondary battery is below the first predetermined temperature, and change the threshold voltage to a second value smaller than the first value when the detected temperature of the secondary battery is above the first predetermined temperature, in response to an output signal of the first comparator; and a non-sensitive time setting circuit arranged to output a high-temperature detect signal to the changing unit when the output signal of the first comparator exceeds the first predetermined temperature for a predetermined period.

The above-mentioned overcharge detecting circuit may include: a voltage divider arranged to output an intermediate voltage from the voltage between the positive electrode and the negative electrode of the secondary battery; and a second comparator arranged to compare the intermediate voltage output from the voltage divider with a fixed threshold voltage, wherein, in response to the output signal of the first comparator, the changing unit changes a division ratio of the voltage divider to a first division ratio when the detected temperature of the secondary battery is below the first predetermined temperature, and changes the division ratio of the voltage divider to a second division ratio smaller than the first division ratio when the detected temperature of the secondary battery is above the first predetermined temperature, in order to change the threshold voltage to the first value or the second value.

The above-mentioned overcharge detecting circuit may be arranged so that the changing unit comprises a third comparator arranged to compare the voltage at the junction point of the thermistor and the resistor in the series circuit with a second reference voltage corresponding to a second predetermined temperature lower than the first predetermined temperature, wherein, in response to an output signal of the third comparator, the changing unit changes the division ratio of the voltage divider to the second division ratio when the detected temperature of the secondary battery is below the second predetermined temperature, in order to change the threshold voltage to the second value.

The above-mentioned overcharge detecting circuit may be arranged so that the thermistor is an NTC thermistor having a negative temperature coefficient.

According to the battery pack of the embodiment of the invention, the temperature protection of the secondary battery can be performed with good accuracy, and appropriate charging control can be performed.

Other objects, features and advantages of the invention will be apparent from the following detailed description when read in conjunction with the accompanying drawings.

DETAILED DESCRIPTION OF PREFERRED EMBODIMENTS

Before describing embodiments of the invention, a description will be given of a reference example for explaining the battery pack of the invention.

Figure 1:
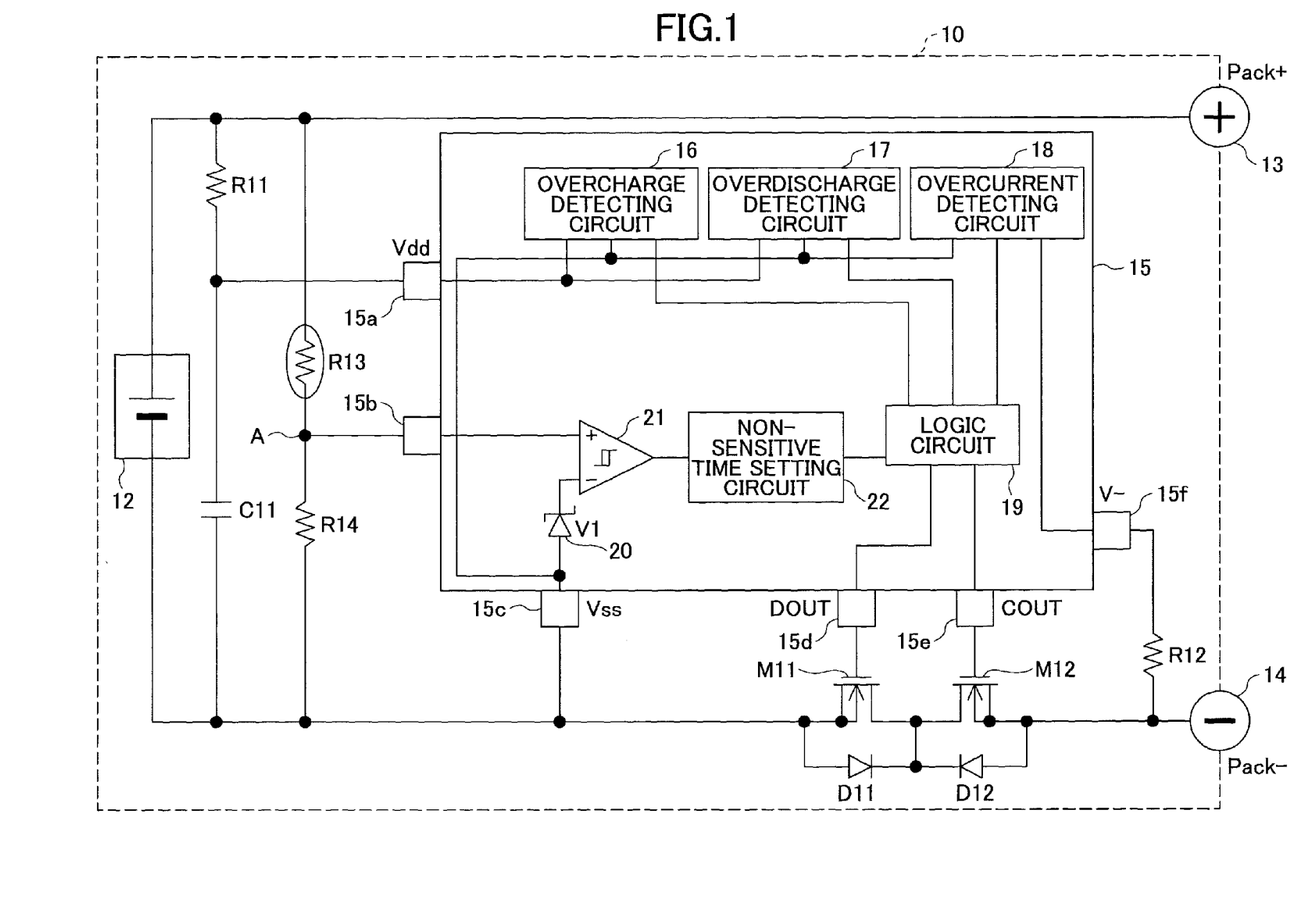
FIG. 1 is a block diagram showing the composition of a reference example for explaining the battery pack of the invention.

FIG. 1 is a block diagram showing the composition of a reference example for explaining the battery pack of the invention.

In the battery pack 10 shown in FIG. 1, a series circuit in which a capacitor C11 and a resistor R11 are connected in series is connected in parallel to a lithium ion battery 12. A positive electrode of the lithium ion battery 12 is connected to an external terminal 13 (Pack+) of the battery pack 10 by wiring, and a negative electrode of the lithium ion battery 12 is connected to an external terminal 14 (Pack-) of the battery pack 10 by wiring via a pair of n channel MOS transistors M11 and M12 for current interception.

The drains of the MOS transistors M11 and M12 are connected to each other, the source of the MOS transistor M11 is connected to the negative electrode of the lithium ion battery 12, and the source of the MOS transistor M12 is connected to the external terminal 14 of the battery pack 10. Body diodes D11 and D12 are connected between the drain and the source of each of the MOS transistors M11 and M12 respectively in an equivalent manner.

A series circuit in which a thermistor R13 and a resistor R14 are connected in series is connected in parallel to the lithium ion battery 12. The thermistor R13 is arranged in the vicinity of the lithium ion battery 12 within the battery pack 10, so that the thermistor R13 is thermally coupled with the lithium ion battery 12. The thermistor R13 used in the battery pack 10 is an NTC (Negative Temperature Coefficient) thermistor which has a negative temperature coefficient.

Figure 2:
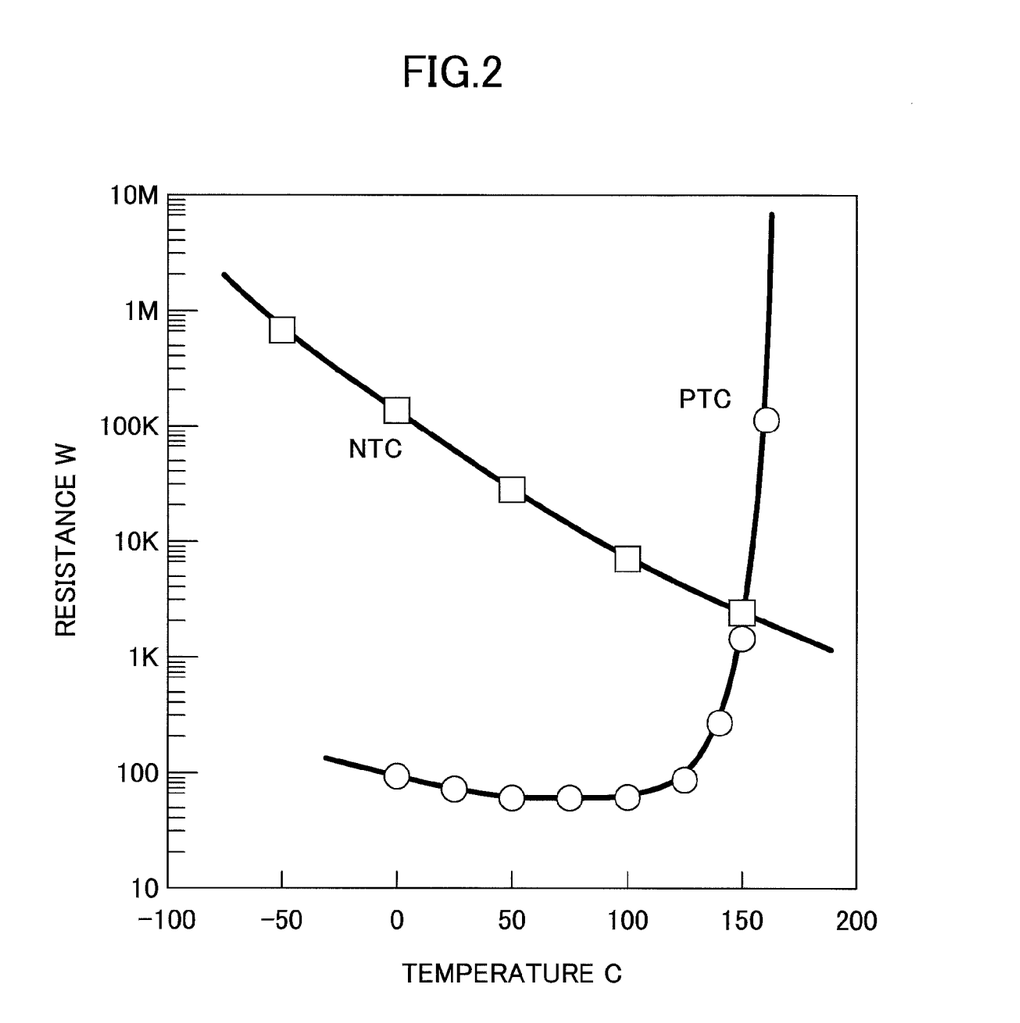
FIG. 2 is a diagram showing the temperature vs. resistance characteristic curves of each of an NTC thermistor and a PTC thermistor.

In this regard, FIG. 2 shows the temperature vs. resistance characteristic curves of each of an NTC thermistor having a negative temperature coefficient and a PTC (Positive Temperature Coefficient) thermistor having a positive temperature coefficient.

A protection IC 15 is arranged in the battery pack 10 so that the protection IC 15 includes an overcharge detecting circuit 16, an overdischarge detecting circuit 17, and an overcurrent detecting circuit 18. A power-source voltage Vdd from the positive electrode of the lithium ion battery 12 is supplied to a terminal 15a of the protection IC 15 through the resistor R11 and a power-source voltage Vss from the negative electrode of the lithium ion battery 12 is supplied to a terminal 15c of the protection IC 15 so that the protection IC 15 operates.

The overcharge detecting circuit 16 detects an overcharge of the lithium ion battery 12 from the voltages of the terminals 15a and 15c, and supplies an overcharge detect signal to a logic circuit 19. The overdischarge detecting circuit 17 detects an overdischarge of the lithium ion battery 12 from the voltages of the terminals 15a and 15c, and supplies an overdischarge detect signal to the logic circuit 19. The overcurrent detecting circuit 18 detects an overcurrent, which means an excessively large current flowing through a resistor R12 connected between a terminal 15f of the protection IC 15 and the external terminal 14 of the battery pack 10, from the voltages of the terminals 15c and 15f, and supplies an overcurrent detect signal to the logic circuit 19.

The protection IC 15 is arranged so that a junction point A of the thermistor R13 and the resistor R14 is connected to a terminal 15b of the protection IC 15, one end of the resistor R12 is connected to the terminal 15f, and the other end of the resistor R12 is connected to the external terminal 14.

The protection IC 15 includes a terminal 15d to which an output signal DOUT of the logic circuit 19 is supplied is connected to the gate of the MOS transistor M11, and a terminal 15e to which an output signal COUT of the logic circuit 19 is supplied is connected to the gate of the MOS transistor M12.

In the protection IC 15, the terminal 15b is connected to the non-inverted input terminal of a comparator 21, the terminal 15c is connected to the negative electrode of a constant voltage source 20 (which is formed of, for example, a Zener diode), and the positive electrode of the constant voltage source 20 is connected to the inverted input terminal of the comparator 21.

Because the thermistor R13 is an NTC thermistor having a negative temperature coefficient as shown in FIG. 2, the resistance of the thermistor R13 decreases as the temperature of the thermistor R13 rises, and accordingly the voltage at the junction point A increases as the temperature of the thermistor R13 rises.

The comparator 21 has a hysteresis characteristic. The comparator 21 compares the voltage at the junction point A (which voltage is supplied to the non-inverted input terminal of the comparator 21) with a constant voltage V1 generated by the constant voltage source 20 (which voltage is supplied to the inverted input terminal of the comparator 21). When the voltage at the junction point A is higher than the constant voltage V1, the comparator 21 outputs a high-level signal. Namely, when the detected temperature from the thermistor R13 exceeds a predetermined temperature (for example, 45 degrees C.) corresponding to the constant voltage V1, the comparator 21 outputs a high-level high-temperature detect signal.

The high-temperature detect signal output from the comparator 21 is supplied to a non-sensitive time setting circuit 22. The non-sensitive time setting circuit 22 outputs a high-level high-temperature detect signal to the logic circuit 19, when the high-level period of the high-temperature detect signal exceeds a predetermined value (for example, 0.5 seconds).

The respective detection signals of the overcharge detecting circuit 16, the overdischarge detecting circuit 17, and the overcurrent detecting circuit 18 are supplied to the logic circuit 19, and the high-temperature detect signal output from the non-sensitive time setting circuit 22 is also supplied to the logic circuit 19.

When an overcharge detect signal from the overcharge detecting circuit 16 is supplied to the logic circuit 19, the logic circuit 19 sets the output signal COUT of the terminal 15e to the low level to turn the MOS transistor M12 to an OFF state. When an overdischarge detect signal from the overdischarge detecting circuit 17 is supplied to the logic circuit 19, the logic circuit 19 sets the output signal DOUT of the terminal 15d to the low level to turn the MOS transistor M11 to an OFF state. When an overcurrent detect signal from the overcurrent detecting circuit 18 is supplied to the logic circuit 19, the logic circuit 19 sets the output signal DOUT of the terminal 15d to the low level to turn the MOS transistor M11 to an OFF state.

Moreover, when a high-level high-temperature detect signal from the non-sensitive time setting circuit 22 is supplied to the logic circuit 19, the logic circuit 19 sets the output signal COUT of the terminal 15e to a low level to turn the MOS transistor M12 to an OFF state. Thereby, the temperature of the lithium ion battery 12 can be detected with good accuracy, and when the temperature of the lithium ion battery 12 is excessively high, the charging of the lithium ion battery 12 can be stopped to protect the lithium ion battery 12 from overcharging.

Because the thermistor R13 used is the NTC thermistor, the resistance of which changes almost linearly to the temperature as shown in FIG. 2, and the thermistor R13 is arranged in the vicinity of the lithium ion battery 12 in the battery pack 10, the temperature of the lithium ion battery 12 can be detected with good accuracy.

In this regard, if the thermistor R13 used is the PTC thermistor having a positive temperature coefficient, the resistance of the PTC thermistor increases rapidly if the temperature of the PTC thermistor exceeds a certain temperature as shown in FIG. 2. For this reason, when the PTC thermistor is used, it is difficult to detect the temperature of the lithium ion battery 12 with good accuracy.

Generally, the lithium ion battery 12 is easily damaged when it is in the fully charged state at a high temperature. For this reason, it is preferred that the charging control of the lithium ion battery 12 in the battery pack 10 is performed while the temperature protection thereof is performed such that, when the temperature of the lithium ion battery 12 is high, the lithium ion battery 12 may not be in the fully charged state.

Accordingly, the battery pack of an embodiment of the invention is arranged to perform appropriate charging control of the lithium ion battery 12 in the battery pack while performing the temperature protection of the lithium ion battery 12 with good accuracy.

A description will now be given of embodiments of the invention with reference to the accompanying drawings.

Figure 3:
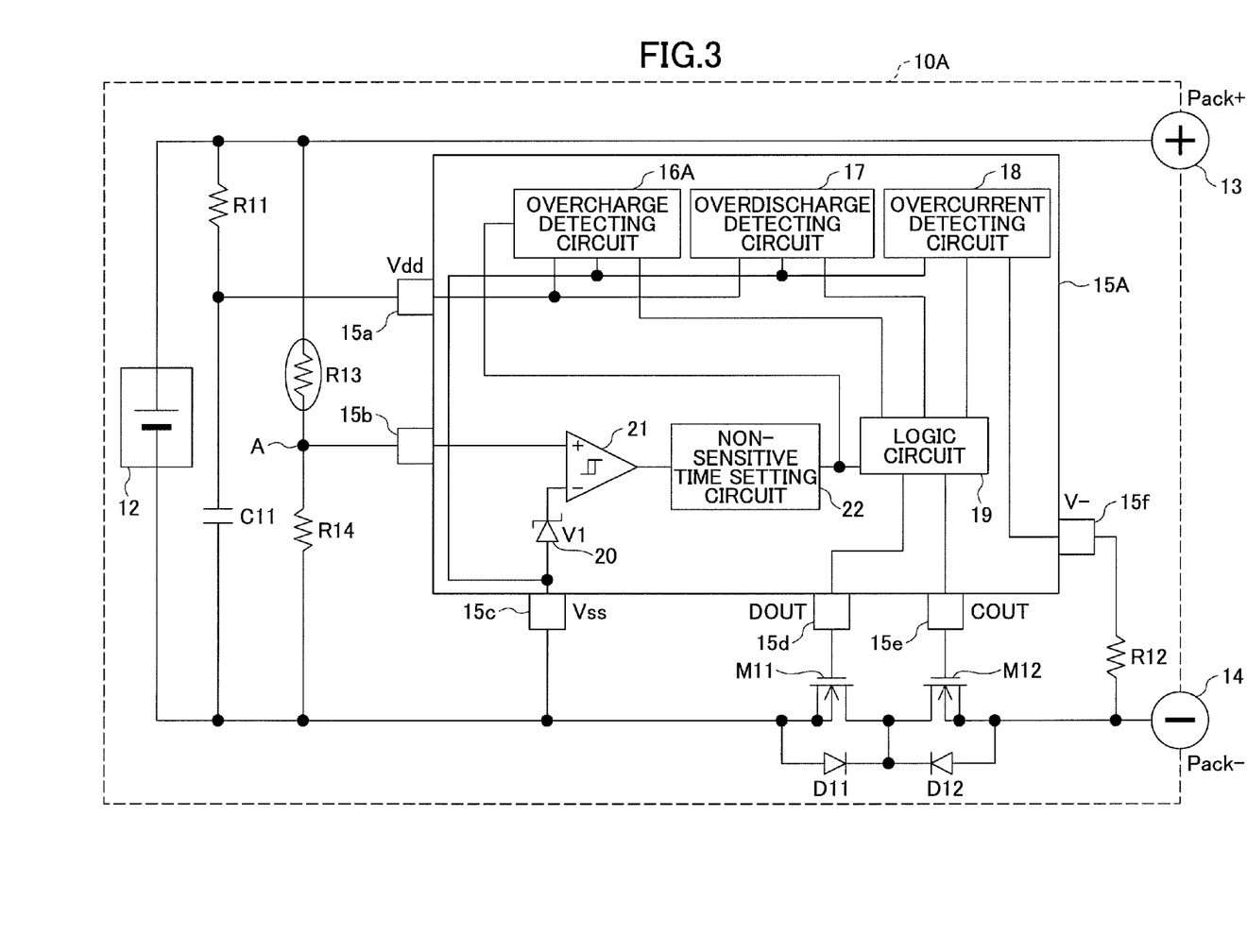
FIG. 3 is a block diagram showing the composition of a battery pack of a first embodiment of the invention.

FIG. 3 is a block diagram showing the composition of a battery pack 10A of a first embodiment of the invention. In FIG. 3, the elements which are the same as corresponding elements in FIG. 1 are designated by the same reference numerals and a description thereof will be omitted.

In this embodiment, when a temperature of the lithium ion battery 12 is higher than a predetermined temperature, a relative threshold voltage used for detecting an overcharge in an overcharge detecting circuit 16A is changed to a lower voltage, so that an overcharge may be detected before the lithium ion battery 12 is in the fully charged state.

In the battery pack 10A of this embodiment shown in FIG. 3, the series circuit in which the capacitor C11 and the resistor R11 are connected in series is connected in parallel to the lithium ion battery 12. The positive electrode of the lithium ion battery 12 is connected to the external terminal 13 (Pack+) of the battery pack 10A by wiring, and the negative electrode of the battery pack 10A is connected to the external terminal 14 (Pack-) of the battery pack 10A by wiring via the pair of n channel MOS transistors M11 and M12 for current interception.

The drains of the MOS transistors M11 and M12 are connected to each other, the source of the MOS transistor M11 is connected to the negative electrode of the lithium ion battery 12, and the source of the MOS transistor M12 is connected to the external terminal 14 of the battery pack 10A. The body diodes D11 and D12 are connected between the drain and the source of each of the MOS transistors M11 and M12 respectively in an equivalent manner.

The series circuit in which the thermistor R13 and the resistor R14 are connected in series is connected in parallel to the lithium ion battery 12. The thermistor R13 is arranged in the vicinity of the lithium ion battery 12 within the battery pack 10A, so that the thermistor R13 is thermally coupled with the lithium ion battery 12. The thermistor R13 used in the battery pack 10A is an NTC thermistor having a negative temperature coefficient.

In this regard, the temperature vs. resistance characteristic curves of each of the NTC thermistor having a negative temperature coefficient and the PTC thermistor having a positive temperature coefficient are shown in FIG. 2.

A protection IC 15A is arranged in the battery pack 10A so that the protection IC 15A includes an overcharge detecting circuit 16A, an overdischarge detecting circuit 17, and an overcurrent detecting circuit 18. The power-source voltage Vdd from the positive electrode of the lithium ion battery 12 is supplied to the terminal 15a of the protection IC 15A through the resistor R11, and the power-source voltage Vss from the negative electrode of the lithium ion battery 12 is supplied to the terminal 15c of the protection IC 15A, so that the protection IC 15A operates.

The overcharge detecting circuit 16A detects an overcharge of the lithium ion battery 12 from the voltages of the terminals 15a and 15c and supplies an overcharge detect signal to the logic circuit 19. The overcharge detecting circuit 16A is arranged to receive a high-temperature detect signal output from the non-sensitive time setting circuit 22. A detailed structure of the overcharge detecting circuit 16A will be described later.

The overdischarge detecting circuit 17 detects an overdischarge of the lithium ion battery 12 from the voltages of the terminals 15a and 15c, and supplies an overdischarge detect signal to the logic circuit 19. The overcurrent detecting circuit 18 detects an overcurrent, which means an excessively large current flowing through the resistor R12, from the voltages of the terminals 15c and 15f, and supplies an overcurrent detect signal to the logic circuit 19.

The protection IC 15A is arranged so that the junction point A of the thermistor R13 and the resistor R14 is connected to the terminal 15b, one end of the resistor R12 is connected to the terminal 15f, and the other end of the resistor R12 is connected to the external terminal 14.

In the protection IC 15A, the terminal 15d to which an output signal DOUT of the logic circuit 19 is supplied is connected to the gate of the MOS transistor M11, and the terminal 15e to which an output signal COUT of the logic circuit 19 is supplied is connected to the gate of the MOS transistor M12.

In the protection IC 15A, the terminal 15b is connected to the non-inverted input terminal of the comparator 21, the terminal 15c is connected to the negative electrode of the constant voltage source 20 (which is formed of, for example, a Zener diode), and the positive electrode of the constant voltage source 20 is connected to the inverted input terminal of the comparator 21.

Because the thermistor R13 is an NTC thermistor having a negative temperature coefficient as shown in FIG. 2, the resistance of the thermistor R13 decreases as the temperature of the thermistor R13 rises, and accordingly the voltage at the junction point A increases as the temperature of the thermistor R13 rises.

The comparator 21 has a hysteresis characteristic. The comparator 21 compares the voltage at the junction point A with the constant voltage V1 generated by the constant voltage source 20. When the voltage at the junction point A is higher than the constant voltage V1, the comparator 21 outputs a high-level signal. Namely, when the detected temperature from the thermistor R13 exceeds a predetermined temperature (for example, 45 degrees C.) corresponding to the constant voltage V1, the comparator 21 outputs a high-level high-temperature detect signal.

The high-temperature detect signal output from the comparator 21 is supplied to the non-sensitive time setting circuit 22. The non-sensitive time setting circuit 22 outputs a low-level high-temperature detect signal to the logic circuit 19, when the high-level period of the high-temperature detect signal exceeds a predetermined value (for example, 0.5 seconds).

The respective detection signals of the overcharge detecting circuit 16A, the overdischarge detecting circuit 17, and the overcurrent detecting circuit 18 are supplied to the logic circuit 19, and the high-temperature detect signal output from the non-sensitive time setting circuit 22 is also supplied to the logic circuit 19.

When an overcharge detect signal from the overcharge detecting circuit 16A is supplied to the logic circuit 19, the logic circuit 19 sets the output signal COUT of the terminal 15e to the low level to turn the MOS transistor M12 to an OFF state. When an overdischarge detect signal from the overdischarge detecting circuit 17 is supplied to the logic circuit 19, the logic circuit 19 sets the output signal DOUT of the terminal 15d to the low level to turn the MOS transistor M11 to an OFF state. When an overcurrent detect signal from the overcurrent detecting circuit 18 is supplied to the logic circuit 19, the logic circuit 19 sets the output signal DOUT of the terminal 15d to the low level to turn the MOS transistor M11 to an OFF state.

Figure 4:
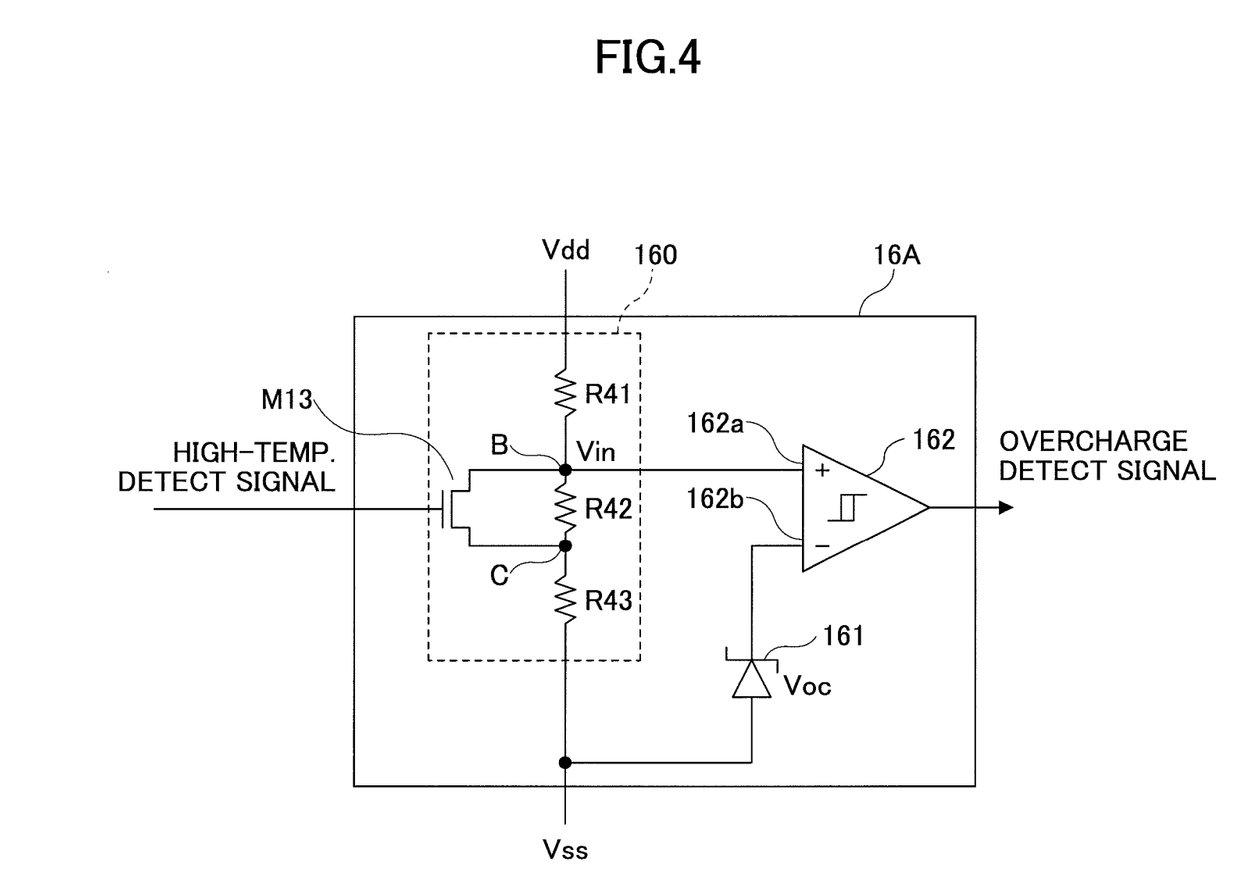
FIG. 4 is a diagram showing the composition of an overcharge detecting circuit in the first embodiment.

Next, a description will be given of the overcharge detecting circuit 16A in this embodiment. FIG. 4 is a diagram showing the composition of an overcharge detecting circuit 16A in this embodiment.

As shown in FIG. 4, the overcharge detecting circuit 16A includes a voltage divider 160, a constant voltage source 161, a comparator 162, and an MOS transistor M13.

The voltage divider 160 includes resistors R41, R42, and R43 which are connected in series, and this voltage divider 160 outputs an intermediate voltage Vin between the power-source voltage Vdd and the power-source voltage Vss from a junction point B of the resistor R41 and the resistor R42. One end of the resistor R41 is connected to the terminal 15a and the power-source voltage Vdd from the terminal 15a is supplied to the voltage divider 160. One end of the resistor R43 is connected to the terminal 15c and the power-source voltage Vss from the terminal 15c is supplied to the voltage divider 160.

The MOS transistor M13 is a changing unit which changes a division ratio of the voltage divider 160. The division ratio of the voltage divider 160 means the ratio of the output voltage to the input voltage (Vdd–Vss) of the voltage divider 160. The source of the MOS transistor M13 is connected to the junction point B of the resistor R41 and the resistor R42, and the drain of the MOS transistor M13 is connected to a junction point C of the resistor R42 and the resistor R43. A high-temperature detect signal output from the non-sensitive time setting circuit 22 is supplied to the gate of the MOS transistor M13. The MOS transistor M13 used in this embodiment is an n channel MOS transistor, similar to the MOS transistor M11 and the MOS transistor M12.

The constant voltage source 161 is a constant voltage source made of a Zener diode or the like, and this constant voltage source 161 generates a constant voltage Voc.

The comparator 162 is arranged so that the non-inverted input terminal 162a of the comparator 162 is connected to the junction point B and the inverted input terminal 162b of the comparator 162 is connected to the positive electrode of the constant voltage source 161. An output signal of the comparator 162 is supplied to the logic circuit 19.

Next, operation of the overcharge detecting circuit 16A will be described.

When no high-temperature detect signal is supplied, a high-level signal is supplied to the gate of the MOS transistor M13 in the overcharge detecting circuit 16A and the MOS transistor M13 is turned to an ON state.

In this case, the comparator 162 compares the voltage Vin at the junction point B with the constant voltage Voc from the constant voltage source 161. The voltage Vin is an intermediate voltage between the power-source voltage Vdd and the power-source voltage Vss, which is output from the voltage divider 160 according to the division ratio of the resistor R41 and the resistors R42 and R43.

When the voltage Vin exceeds the constant voltage Voc, the comparator 162 outputs a high-level overcharge detect signal which indicates that an overcharge is occurring. This overcharge detect signal is supplied to the logic circuit 19.

When the high-level overcharge detect signal is received, the logic circuit 19 sets the COUT output of the terminal 15e to the low level to turn the MOS transistor M12 to an OFF state, so that the charging of the secondary battery is stopped.

Therefore, when the MOS transistor M13 is turned ON, the intermediate voltage Vin between the power-source voltage Vdd and the power-source voltage Vss, which is produced according to the division ratio of the resistor R41 and the resistor R43, is used as a relative threshold voltage (a first value) for detecting an overcharge of the lithium ion battery 12. The division ratio of Vin/(Vdd–Vss) at this time is equal to the ratio of (R41+R43) (a first division ratio).

When the detected temperature from the thermistor R13 is higher than the predetermined temperature, the non-sensitive time setting circuit 22 outputs the high-temperature detect signal. This high-temperature detect signal is supplied to the gate of the MOS transistor M13 and the MOS transistor M13 is turned to an OFF state.

Therefore, when the MOS transistor M13 is turned OFF, the voltage Yin at the junction point B is equal to an intermediate voltage Vin between the power-source voltage Vdd and the power-source voltage Vss, which is produced according to the ratio of the resistor R41 and the resistors R42 and R43.

When the voltage Vin exceeds the constant voltage Voc at this time, the comparator 162 outputs a high-level overcharge detect signal, which indicates that an overcharge is occurring Therefore, when the MOS transistor M13 is turned OFF, the intermediate voltage Vin between the power-source voltage supply Vdd and the power-source voltage Vss, which is produced according to the ratio of the resistor R41 and the resistors R42 and R43, is used as a relative threshold voltage (a second value) for detecting an overcharge of the lithium ion battery 12. The division ratio of Vin/(Vdd–Vss) at this time is equal to the ratio of (R42+R43)/(R41+R42+R43) (a second division ratio).

In this embodiment, it is preferred that the resistances of the resistors R41, R42 and R43 are selected so that the second division ratio is smaller than the first division ratio.

Specifically, in this embodiment, when the detected temperature from the thermistor R13 is higher than 45 degrees C., the comparator 21 outputs a high-temperature detect signal. In this embodiment, when the MOS transistor M13 is in the ON state and the voltage Vdd is larger than 4.3 V (the first value), it is detected that an overcharge of the lithium ion battery 12 is occurring. And, in this embodiment, when the MOS transistor M13 is in the OFF state and the voltage Vdd is larger than 4.1 V (the second value), it is detected that an overcharge of the lithium ion battery 12 is occurring.

Figure 5:
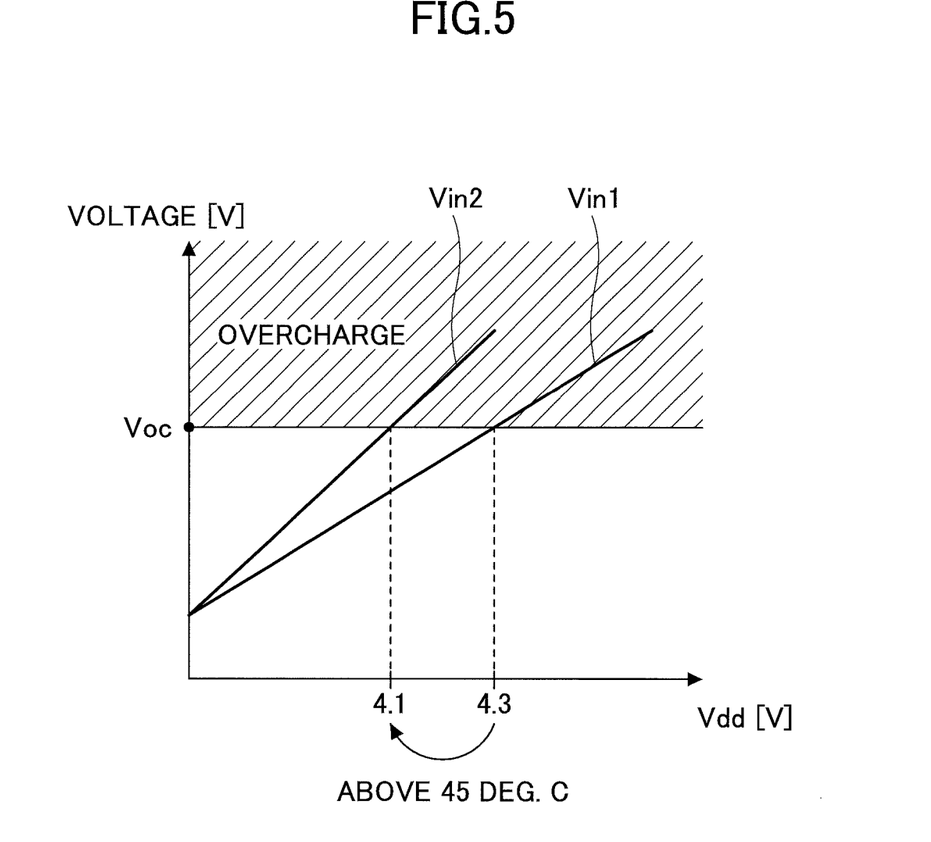
FIG. 5 is a diagram for explaining operation of a comparator in the first embodiment.

Next, the switching of the relative threshold voltage in this embodiment will be described. FIG. 5 is a diagram for explaining operation of the comparator 162 of the overcharge detecting circuit 16A in this embodiment.

In FIG. 5, the vertical axis indicates the voltage Vin of the non-inverted input terminal of the comparator 162 and the horizontal axis indicates the power-source voltage Vdd.

In this embodiment, if charging of the lithium ion battery 12 is started when the detected temperature from the thermistor R13 is less than 45 degrees C. (the MOS transistor M13 is turned ON), the voltage Vin increases along the curve indicated by the graph Vin1 in FIG. 5. In this case, the comparator 162 outputs a high-level overcharge detect signal when the voltage Vdd reaches 4.3 V (the first value) exceeding the constant voltage Voc.

In this embodiment, when the detected temperature from the thermistor R13 is above 45 degrees C., the MOS transistor M13 is turned OFF and the division ratio of the power-source voltage Vdd and the power-source voltage Vss is changed. If charging of the lithium ion battery 12 is started in this state, the voltage Vin increases along the inclination indicated by the graph Vin2 in FIG. 5. In this case, the comparator 162 outputs a high-level overcharge detect signal when the voltage Vdd reaches 4.1 V (the second value) exceeding the constant voltage Voc.

According to this embodiment, the relative threshold voltage used for detecting an overcharge of the lithium ion battery 12 is changed by controlling the ON or OFF state of the MOS transistor M13 based on the detected temperature from the thermistor R13, and the division ratio between the power-source voltage Vdd and the power-source voltage Vss is changed.

Specifically, in this embodiment, when the detected temperature from the thermistor R13 is higher than the predetermined temperature, the division ratio between the power-source voltage Vdd and the power-source voltage Vss is changed from the first division ratio to the second division ratio. Thereby, the relative threshold voltage used for detecting an overcharge of the lithium ion battery 12 is changed from the first value corresponding to the first division ratio to the second value corresponding to the second division ratio. Suppose that the second value is smaller than the first value in this embodiment.

Accordingly, in this embodiment, before the lithium ion battery 12 is in the fully charged state at a high temperature, an overcharge of the lithium ion battery 12 can be detected in order to stop the charging of the lithium ion battery 12. It is possible to prevent the lithium ion battery 12 from being fully charged at a high temperature. Therefore, the temperature protection of the lithium ion battery 12 can be performed with good accuracy and appropriate charging control can be performed.

Figure 6:
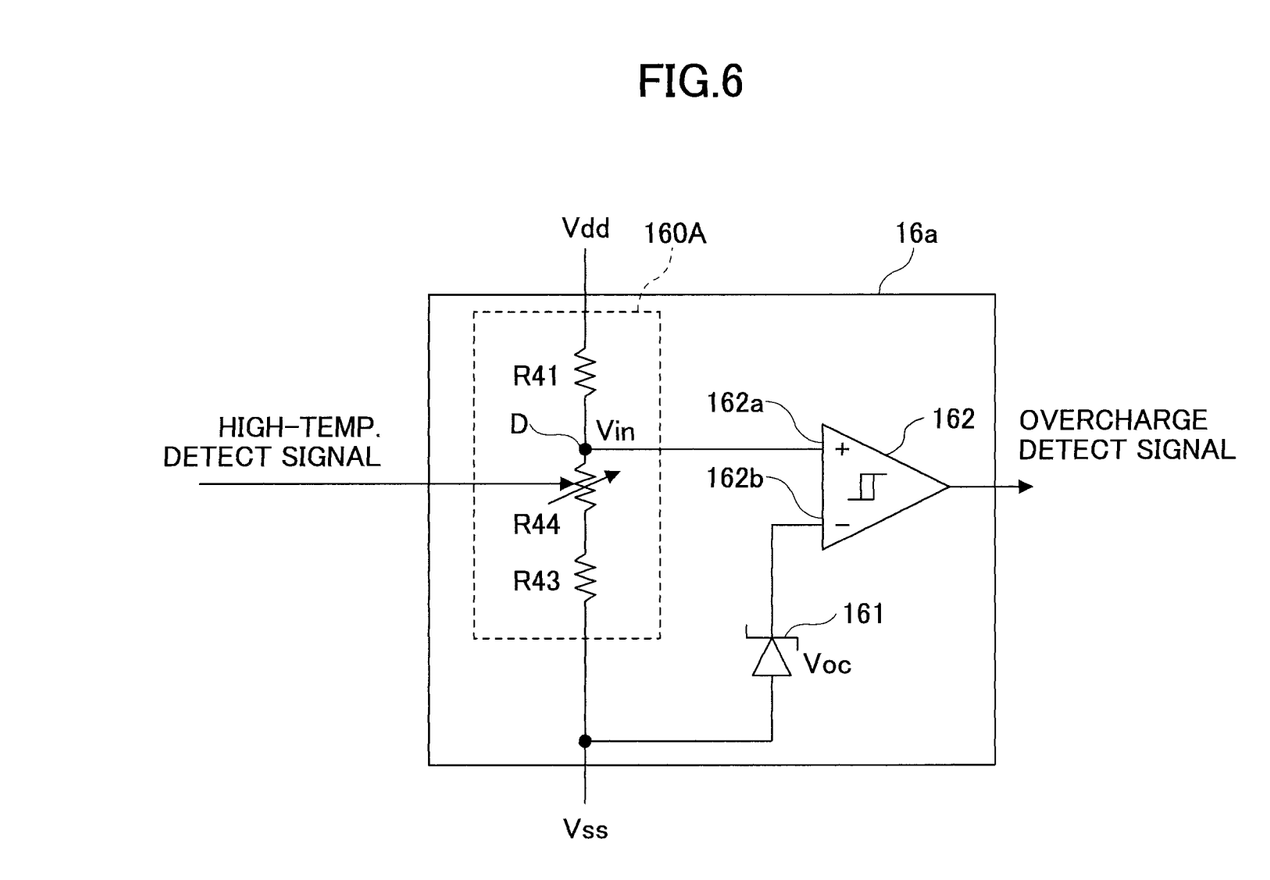
FIG. 6 is a diagram showing the composition of a modification of the overcharge detecting circuit in the first embodiment.
Figure 7:
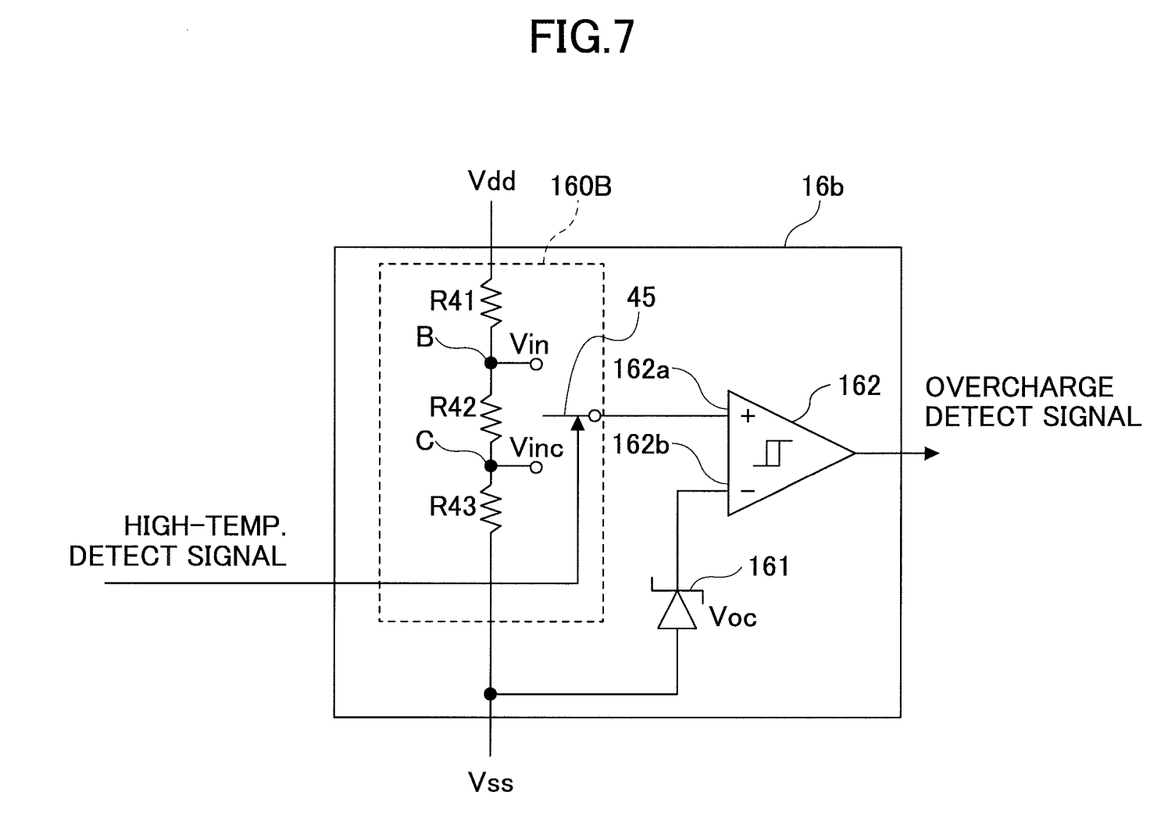
FIG. 7 is a diagram showing the composition of a modification of the overcharge detecting circuit in the first embodiment.

FIG. 6 and FIG. 7 show modifications of the overcharge detecting circuit 16A in this embodiment. FIG. 6 shows the composition of a modification of the overcharge detecting circuit in the first embodiment. FIG. 7 shows the composition of another modification of the overcharge detecting circuit in the first embodiment.

In the overcharge detecting circuit 16a shown in FIG. 6, the voltage divider 160A includes a resistor R41, a resistor R43, and a variable resistor R44. In the voltage divider 160A, the resistor R41, the variable resistor R44, and the resistor R43 are connected in series between the power-source voltage Vdd and the power-source voltage Vss. This voltage divider 160A outputs an intermediate voltage Vin between the power-source voltage Vdd and the power-source voltage Vss.

In this modification, the variable resistor R44 serves as a changing unit which changes the division ratio of the voltage divider 160A. A junction point D of the resistor R41 and the variable resistor R44 is connected to the non-inverted input terminal of the comparator 162.

In the voltage divider 160A, when a high-temperature detect signal is supplied, the resistance of the variable resistor R44 is increased so that the intermediate voltage Vin output from the voltage divider 160A is increased. Therefore, in this modification, when a high-temperature detect signal is supplied, the relative threshold voltage used for detecting an overcharge of the lithium ion battery 12 can be changed according to the changed division ratio between the power-source voltage Vdd and the power-source voltage Vss.

The overcharge detecting circuit 16b, shown in FIG. 7, includes a switch 45 which serves as a changing unit which changes the division ratio of the voltage divider 160B. In the voltage divider 160B, when no high level high-temperature detect signal is supplied, the moving contact of the switch 45 is turned to the junction point C of the resistor R42 and the resistor R43 so that the junction point C is connected to the non-inverted input terminal of the comparator 162 through the switch 45. When a high-temperature detect signal is supplied, the moving contact of the switch 45 is turned to the junction point B of the resistor R41 and the resistor R42 so that the junction point B is connected to the non-inverted input terminal of the comparator 162 through the switch 45. Normally, the voltage Vinc output from the junction point C is lower than the voltage Yin output from the junction point B.

Therefore, also in this modification, when a high-level high-temperature detect signal is supplied, the relative threshold voltage used for detecting an overcharge of the lithium ion battery 12 can be changed according to the changed division ratio between the power-source voltage Vdd and the power-source voltage Vss.

Next, a battery pack 10B of a second embodiment of the invention will be described.

Figure 8:
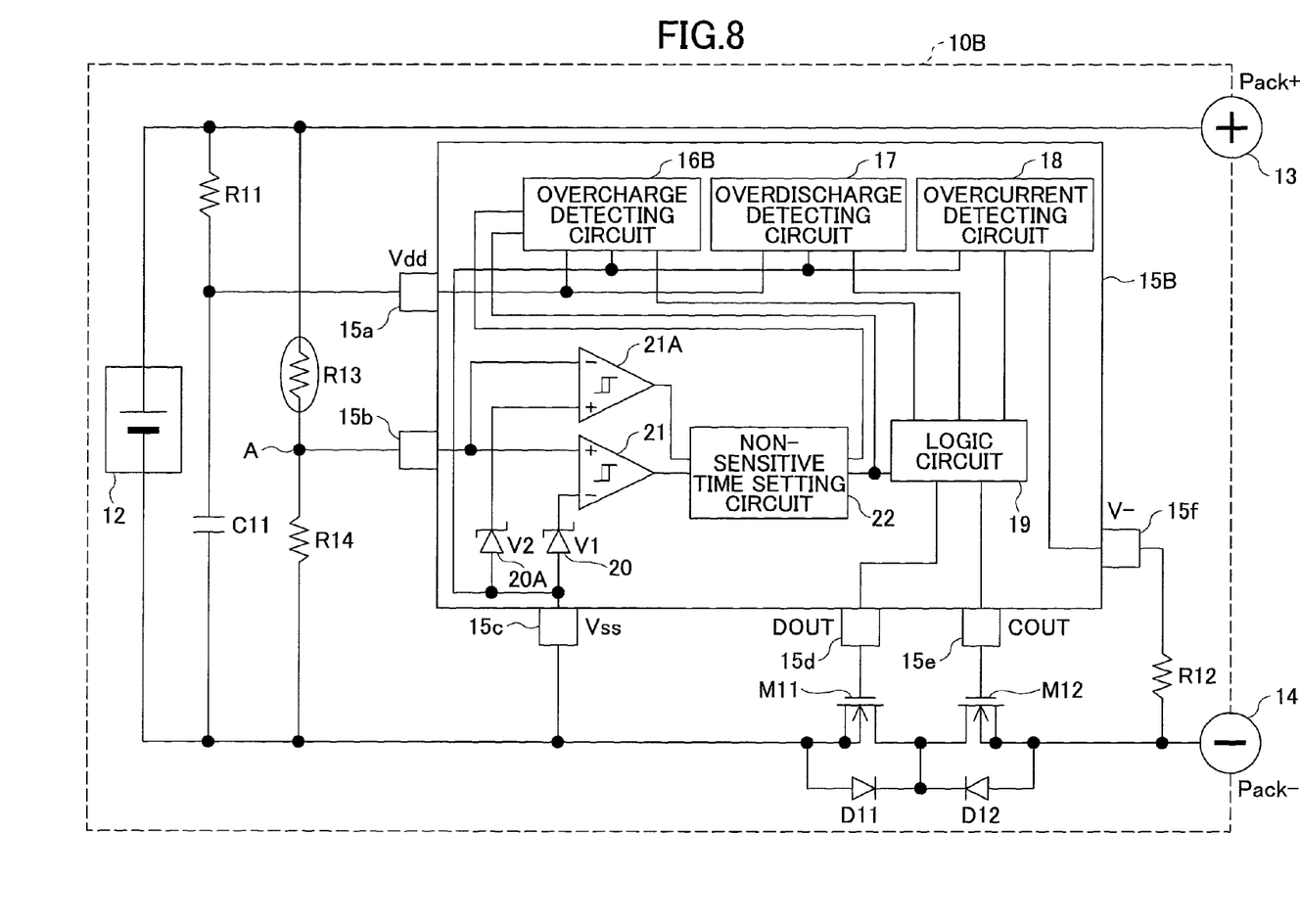
FIG. 8 is a block diagram showing the composition of a battery pack of a second embodiment of the invention.

In the second embodiment, when a temperature detected by the thermistor R13 is higher than a first predetermined temperature or lower than a second predetermined temperature, the threshold voltage for detecting an overcharge of the lithium ion battery 12 is changed by changing the division ratio between the power-source voltage Vdd and the power-source voltage Vss, so that an overcharge may be detected before the lithium ion battery 12 is in the fully charged state.

FIG. 8 is a block diagram showing the composition of the battery pack 10B of the second embodiment of the invention. In FIG. 8, the elements which are the same as corresponding elements in FIG. 3 are designated by the same reference numerals, and a description thereof will be omitted.

In the battery pack 10B shown in FIG. 8, the protection IC 15B includes a comparator 21 arranged to detect whether the detected temperature from the thermistor R13 is higher than the first predetermined temperature, and a comparator 21A arranged to detect whether the detected temperature from the thermistor R13 is lower than the second predetermined temperature.

In this embodiment, the first predetermined temperature is equal to, for example, 45 degrees C., and the second predetermined temperature is equal to, for example, 0 degrees C.

The inverted input terminal of the comparator 21A is connected to the terminal 15b. The non-inverted input terminal of the comparator 21A is connected to the positive electrode of a constant voltage source 20A (which is made of a Zener diode or the like). The negative electrode of the constant voltage source 20A is connected to the terminal 15c.

The comparator 21A outputs a high-level low-temperature detect signal, when the detected temperature from the thermistor R13 is lower than the second predetermined temperature (for example, 0 degrees C.) corresponding to a constant voltage V2 generated by the constant voltage source 20A.

The low-temperature detect signal output from the comparator 21A is supplied to the non-sensitive time setting circuit 22. The non-sensitive time setting circuit 22 outputs a low-level low-temperature detect signal to the overcharge detecting circuit 16B, when the high-level period of the low-temperature detect signal exceeds a predetermined value (for example, 0.5 seconds).

Figure 9:
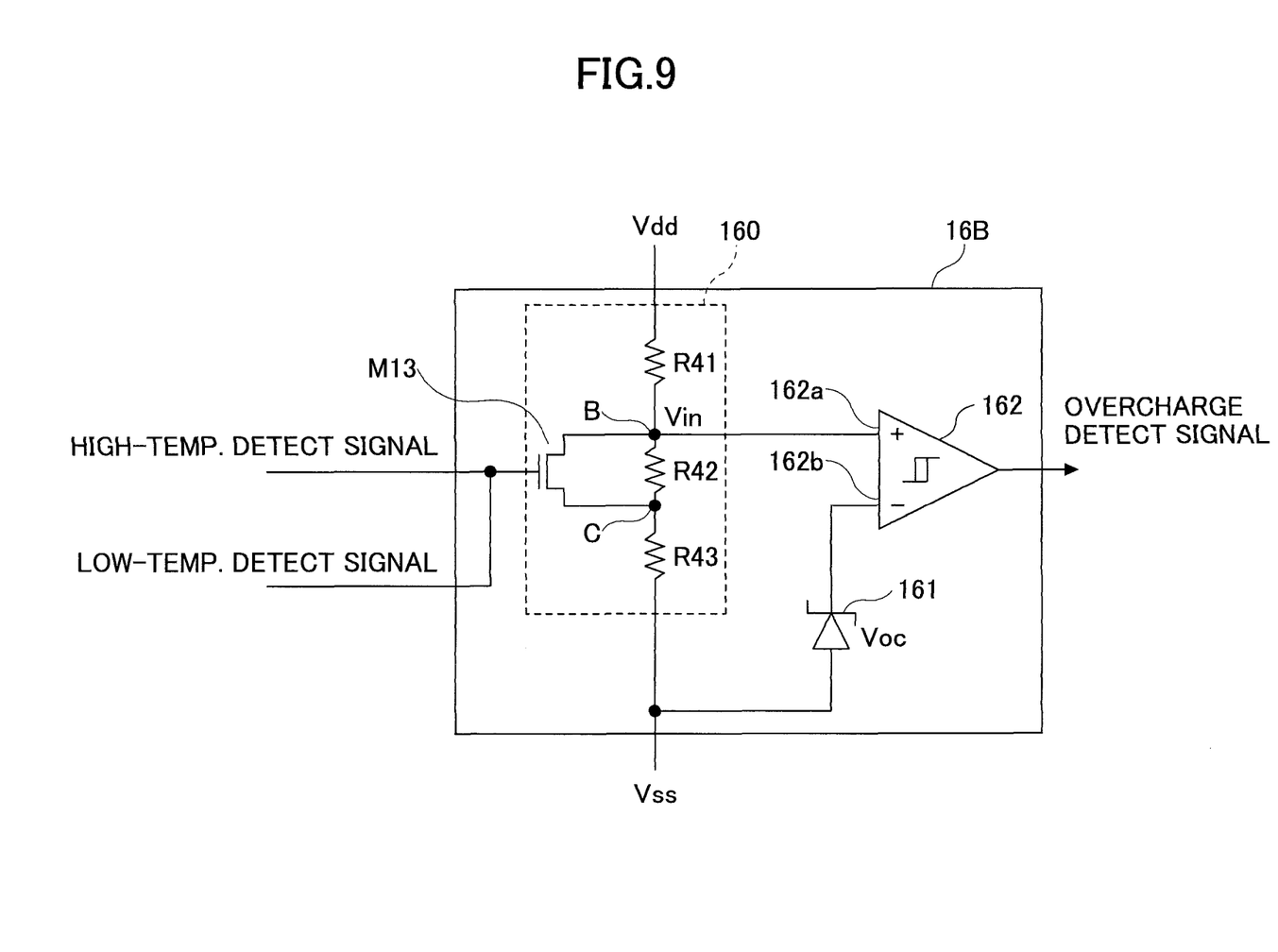
FIG. 9 is a diagram showing the composition of an overcharge detecting circuit in the second embodiment.

FIG. 9 shows the composition of the overcharge detecting circuit 16B in the second embodiment.

The composition of the overcharge detecting circuit 16B of this embodiment is basically the same as that of the overcharge detecting circuit 16A of the first embodiment. The overcharge detecting circuit 16B differs from the overcharge detecting circuit 16A in that either a high-temperature detect signal or a low-temperature detect signal is supplied to the gate of the MOS transistor M13 in the overcharge detecting circuit 16B.

When either a low-level high-temperature detect signal or a low-level low-temperature detect signal is supplied, the overcharge detecting circuit 16B of this embodiment performs the operation that is the same as the operation of the overcharge detecting circuit 16A of the first embodiment. Therefore, according to this embodiment, when the detected temperature from the thermistor R13 is higher than the first predetermined temperature, or when the detected temperature from the thermistor R13 is lower than the second predetermined temperature, the relative threshold voltage used for detecting an overcharge of the lithium ion battery 12 can be reduced. For this reason, it is possible to prevent the lithium ion battery 12 from being fully charged when the lithium ion battery 12 is at a high temperature or a low temperature, and the temperature protection of the lithium ion battery 12 can be performed with good accuracy and appropriate charging control can be performed.

The present invention is not limited to the above-described embodiments, and variations and modifications may be made without departing from the scope of the invention.

What is claimed is:

1. An overcharge detecting circuit provided in a battery pack and configured to compare a voltage between a positive electrode and a negative electrode of a secondary battery with a threshold voltage to detect an overcharge of the secondary battery, and to turn off a switching element in a wiring between a load and the secondary battery or between a charging device and the secondary battery, the battery pack comprising:
a series circuit including a thermistor and a resistor connected in series, the series circuit being arranged in a vicinity of the secondary battery, thermally coupled with the secondary battery, and connected in parallel to the secondary battery;
a first comparator arranged to compare a voltage at a junction point of the thermistor and the resistor in the series circuit with a first reference voltage corresponding to a first predetermined temperature;
a changing unit arranged to change the threshold voltage to a first value when a detected temperature of the secondary battery is below the first predetermined temperature, and change the threshold voltage to a second value smaller than the first value when the detected temperature of the secondary battery is above the first predetermined temperature, in response to an output signal of the first comparator; and
a non-sensitive time setting circuit arranged to output a high-temperature detect signal to the changing unit when the output signal of the first comparator exceeds the first predetermined temperature for a predetermined period, and wherein the overcharge detecting circuit comprises:
a voltage divider arranged to output an intermediate voltage from the voltage between the positive electrode and the negative electrode of the secondary battery; and
a second comparator arranged to compare the intermediate voltage output from the voltage divider with a fixed threshold voltage,
wherein, in response to the output signal of the first comparator, the changing unit changes a division ratio of the voltage divider to a first division ratio when the detected temperature of the secondary battery is below the first predetermined temperature, and changes the division ratio of the voltage divider to a second division ratio smaller than the first division ratio when the detected temperature of the secondary battery is above the first predetermined temperature, in order to change the threshold voltage to the first value or the second value.

2. The overcharge detecting circuit according to claim 1, wherein the changing unit comprises a third comparator arranged to compare the voltage at the junction point of the thermistor and the resistor in the series circuit with a second reference voltage corresponding to a second predetermined temperature lower than the first predetermined temperature,
wherein, in response to an output signal of the third comparator, the changing unit changes the division ratio of the voltage divider to the second division ratio when the detected temperature of the secondary battery is below the second predetermined temperature, in order to change the threshold voltage.

3. The overcharge detecting circuit according to claim 1, wherein the thermistor is an NTC thermistor having a negative temperature coefficient.

4. An integrated circuit provided in a battery pack and configured to compare a voltage between a positive electrode and a negative electrode of a secondary battery with a threshold voltage to detect an overcharge of the secondary battery, and to turn off a switching element in a wiring between a load and the secondary battery or between a charging device and the secondary battery, the battery pack comprising:
a first comparator arranged to compare a voltage at a junction point of a thermistor and a resistor with a first reference voltage corresponding to a first predetermined temperature, the thermistor and the resistor being arranged in a vicinity of the secondary battery and connected in parallel to the secondary battery;
a changing unit arranged to change the threshold voltage to a first value when a detected temperature of the secondary battery is below the first predetermined temperature, and change the threshold voltage to a second value smaller than the first value when the detected temperature of the secondary battery is above the first predetermined temperature, in response to an output signal of the first comparator; and
a non-sensitive time setting circuit arranged to output a high-temperature detect signal to the changing unit when the output signal of the first comparator exceeds the first predetermined temperature for a predetermined period, and wherein the integrated circuit comprises:
a voltage divider arranged to output an intermediate voltage from the voltage between the positive electrode and the negative electrode of the secondary battery; and
a second comparator arranged to compare the intermediate voltage output from the voltage divider with a fixed threshold voltage,
wherein, in response to the output signal of the first comparator, the changing unit changes a division ratio of the voltage divider to a first division ratio when the detected temperature of the secondary battery is below the first predetermined temperature, and changes the division ratio of the voltage divider to a second division ratio smaller than the first division ratio when the detected temperature of the secondary battery is above the first predetermined temperature, in order to change the threshold voltage to the first value or the second value.

5. The integrated circuit as claimed in claim 4, comprising an input terminal for inputting the voltage at the junction point of the thermistor and the resistor.

6. The integrated circuit according to claim 4, wherein the changing unit comprises a third comparator arranged to compare the voltage at the junction point of the thermistor and the resistor in the series circuit with a second reference voltage corresponding to a second predetermined temperature lower than the first predetermined temperature,
wherein, in response to an output signal of the third comparator, the changing unit changes the division ratio of the voltage divider to the second division ratio when the detected temperature of the secondary battery is below the second predetermined temperature, in order to change the threshold voltage.

* * * * *